United States Patent

[11] 3,581,419

| [72] | Inventor | Robert S. McCracken<br>Pasadena, Calif. |
|---|---|---|
| [21] | Appl. No. | 795,542 |
| [22] | Filed | Jan. 31, 1969 |
| [45] | Patented | June 1, 1971 |
| [73] | Assignee | Beagle Manufacturing Company |

[54] A DECORATIVE DOOR-HUNG TREE STRUCTURE FOR HOLDING GREETING CARDS
4 Claims, 6 Drawing Figs.

[52] U.S. Cl.............................................. 40/124, 161/14, 161/23, 161/32
[51] Int. Cl................................................ G09f 1/10
[50] Field of Search.................................. 161/23, 24, 12, 13, 14, 15, 22, 27, 32; 40/124, 124.4, 124.1, 124.2

[56] References Cited
UNITED STATES PATENTS

| 3,219,512 | 11/1965 | Kovacevic | 161/22 |
| 2,586,791 | 2/1952 | Dattilo | 161/23X |
| 3,310,912 | 3/1967 | Melander | 161/23UX |
| 2,976,632 | 3/1961 | Phillips | 161/23 |
| 2,951,303 | 9/1960 | Hovlid | 161/23X |
| 3,027,671 | 4/1962 | Duvall | 161/23 |
| 2,042,672 | 6/1936 | Maclean | 40/124UX |

*Primary Examiner*—Philip Dier
*Attorney*—Nilsson & Robbins

ABSTRACT: A decorative door-hung tree structure is disclosed to be made of foam plastic, as for holding greeting cards or to support decorative accessories. A set of skirt member of progressively varying size are affixed together in lapped relationship by bristled fasteners which extend through adjacent skirt sections. A top decoration and base are similarly affixed to complete an assembly which is secured to a ribbon, useful for suspending the entire unit on a door.

PATENTED JUN 1 1971 3,581,419
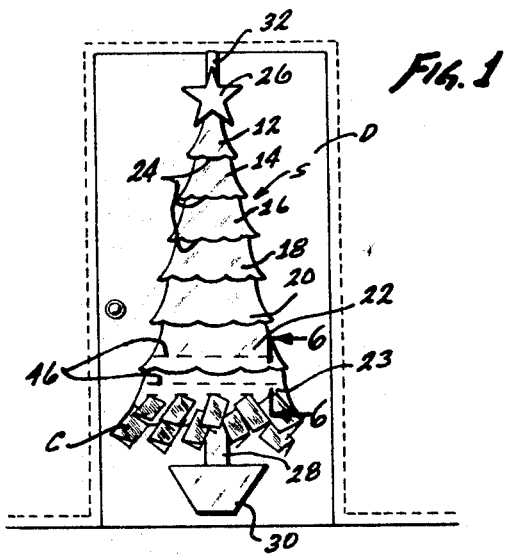
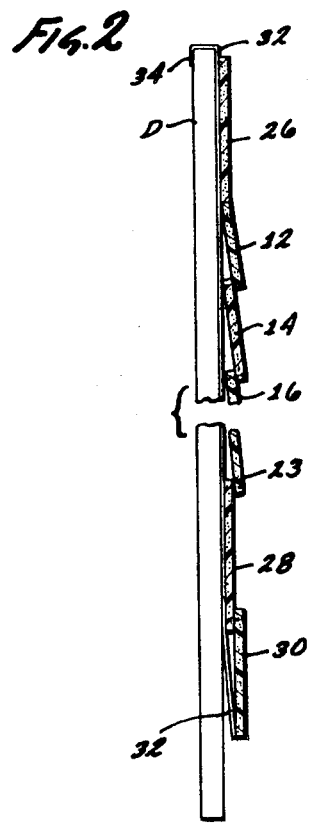
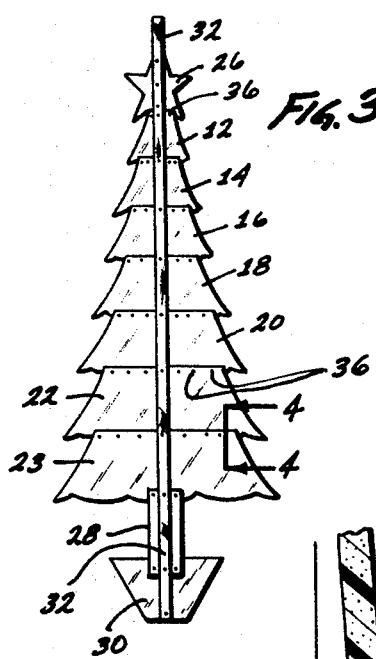
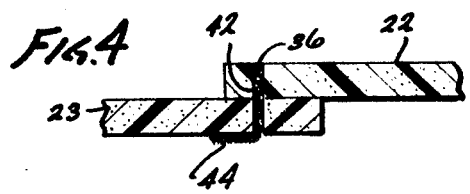
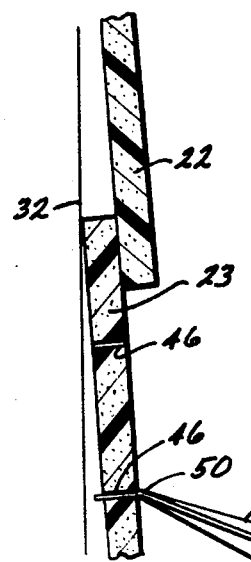
INVENTOR
BY Nilsson & Robbins
ATTORNEYS

A DECORATIVE DOOR-HUNG TREE STRUCTURE FOR HOLDING GREETING CARDS

BACKGROUND AND SUMMARY OF THE INVENTION

One of the most popular decorations employed during the Christmas season has traditionally been the Christmas tree. However, the continually increasing population along with the gradual depletion of forests has tended to limit the availability of trees. As a result, for example, many Christmas trees are now commercially produced on Christmas tree farms for use simply as an item of decor during the Christmas New Years season. The necessity of producing trees commercially has in turn necessitated higher prices for trees. Consequently, the cost of a traditional tree sometimes imposes a significant burden upon consumers. As a consequence, of this and other considerations, manufactured or synthetic trees have been widely produced for use over a period of several years. However, one of the difficulties of such trees involves their storage between intervals of use.

In addition to the basic cost of a tree, substantial additional cost in normally involved in decorations and the like for the tree. Furthermore, traditional as well as manufactured trees require a substantial space and involve a significant effort to place and decorate. As a result, a need exists for a structure which may be employed as an effective substitute for traditional and manufactured Christmas trees, which structure is economical and convenient to use.

The seasons greeting cards have also become an integral part of the Christmas and New Year season. Most persons receive a substantial number of highly decorative cards. However, conventionally cards are observed on receipt, held briefly, then destroyed. As a result, a need exists for an economical and attractive structure which may be employed to display highly colorful and attractive greeting cards during the Christmas and New Years season.

In general, the present invention comprises a tree-simulating structure formed of inexpensive, lightweight foam, which unit may be easily assembled and mounted upon a door. The structure accommodates variable height, and incorporates effective fasteners in the form of bristled studs along with a support ribbon extending the full length of the structure. Elongate slots of substantially 1½ inch length and extending in parallel relationship are provided through the foam to receive decorative greeting cards.

BRIEF DESCRIPTION OF THE DRAWINGS

In the drawings, which constitute a part of this specification, exemplary embodiments demonstrating various objectives and features hereof are set forth, specifically:

FIG. 1 is a front view of a tree structure constructed in accordance with the present invention;

FIG. 2 is a fragmentary vertical section taken centrally through the structure of FIG. 1;

FIG. 3 is a rear elevation view of the structure of FIG. 1;

FIG. 4 is a fragmentary sectional view taken along line 4—4 of FIG. 3;

FIG. 5 is a view similar to FIG. 4 indicating the component parts prior to assembly; and FIG. 6 is a fragmentary sectional view taken along line 6—6 of FIG. 1.

Referring initially to FIG. 1, there is shown a door D having a tree structure S in accordance herewith mounted thereon. The structure S is also shown supporting several greeting cards C the number of which in actual practice may vary with individual use.

The structure S, as shown in FIG. 1, comprises several different component parts formed of plastic foam and affixed together by fasteners as disclosed in detail below. The central or foliage-representing components are somewhat skirt-shaped members of progressively varying size, increasing in size from top to bottom. Specifically, starting at the top of the foliage-representing portion of the structure a skirt 12 laps and is affixed to a larger skirt 14 which is similarly affixed to a skirt 16 followed in sequence by skirts 18, 20 and 22. The plane configuration of the skirts is somewhat trapezoidal with the bases each defining scallops 24 which overlap the next-lower skirt. Styrene foam has been used.

The uppermost skirt 12 is affixed in coplanar relationship with a top decoration 26, in star configuration as shown in the illustrative example. The lowest skirt 23 has a trunk member 28 affixed to the rear thereof, the lower portion of which receives an affixed base 30. The trunk member 28 may comprise a thickness of rectangular foam material while the base 30 takes the form of an inverted trapezoidal thickness of similar material.

The lapped relationship of the skirts, e.g., skirt 12 over skirt 14, is illustrated in the sectional view of FIG. 2. Specifically, the skirt 12 is contiguous to the door D at its upper end and is canted away from the door 10, i.e., angularly offset from the vertical, to overlap the skirt 14. The individual skirts below the skirt 12 are similarly positioned over the skirt immediately therebelow.

The individual skirts along with the decoration 26, the trunk member 28 and the base 30 are affixed together by fasteners as disclosed in detail below. However, these units are additionally joined by a ribbon 32 which extends substantially the entire length of the structure S and overlaps the top of the door D providing a terminal end 34 to be affixed to the door D as by adhesive-bearing tape. Only the top portion of the ribbon 32 is visible in the assembled structure S, as shown in FIG. 1. However, the ribbon 32 affords integral support for the individual components of the structure by extending substantially the full length thereof as shown in FIG. 3. The material of the ribbon may be various fabrics or tapes and in one exemplary embodiment, a colorful ribbon of 3 inch width has been found particularly effective. With regard to the size of the skirts 12, 14, 16, 18, 20, 22, and 23, foam material of ½-inch thickness has been effectively used in one exemplary embodiment and skirts of between 6 and 8 inches in height have been employed. The top decoration 26 as well as the trunk member 28 and the base 30 were provided of similar material, of similar thickness in the proportional relationship indicated in the drawings.

The production of the structure S as shown in FIGS. 1, 2 and 3 initially involves the formation of the individual foam components, e.g., the skirts. These components may be formed as described above either by various foam cutting or molding techniques as well known in the prior art. In the assembly of the units into an integral structure, the component parts are laid out in the illustrated arrangement. It is to be noted, that by varying the degree of overlap, considerable variation in the total height of the unit may be accomplished. That is, with each of the skirts or segments affording a variable overlap, heights within a substantial range may be accomplished.

Upon completing the desired arrangement of the component members, as considered above, fasteners to fix the members together are inserted as shown in an enlarged section in FIG. 4. The fasteners 36 (FIG. 5) comprise twisted wires 38 with fibers 40 held therein. In practice, various fibers have been found to be successful although, relatively stiff yieldable fibers as sometimes employed for cleaning devices have been found particularly effective. To affix a pair of contiguous skirts together, the skirts are simply overlapped as shown in FIG. 5, then the fasteners 36 are forced through the thickness of the adjacent members, e.g., skirts 22 and 23. The insertion of the fastener produces a hole 42 (FIG. 4) and when the fastener is in position, the protruding portion 44 is simply bent to lie against the rear surface of the skirt, e.g., skirt 23, as shown in FIG. 4. The use of fasteners incorporating a substantially rigid center, e.g., a pair of twisted wires, and radially extending bristles, e.g., synthetic fibers, affords an extremely effective and durable manner for attaching the component segments of the structure S together as an integral unit.

As a further connector for the individual components, the ribbon 32, as shown in FIG. 3 is attached along the entire length of the structure. Specifically, the ribbon 32 is laid to extend the full length of the tree so that the excess extends from the top. The ribbon is then pinned to each of the foam components of the tree using the fasteners 36 as described above. The result is an integrated structure capable of supporting a substantial decorative load yet one which can be disassembled for subsequent reuse.

As indicated, a convenient mount for the structure S comprises a door D. In this regard, a door may be selected in most buildings which provides a commanding location while accommodating the structure without substantial inconvenience or sacrifice of space. As indicated above, the structure hereof thereby is particularly useful in locations of limited space, e.g., apartments, small homes, offices and so on.

On completion of the assembly as indicated in FIG. 3, the structure S is mounted upon a door or other surface as indicated in FIGS. 1 and 2. As suggested above, the support for the structure S may be provided simply by the ribbon 32 with the end 34 adhesively affixed to the door. Next, to set greeting cards C into the structure, slits 46 (FIGS. 1 and 6) are cut in parallel relationship, through the skirts so as to lie generally perpendicular to the axis of the tree structure S. The slits 46 may be cut simply with a knife or other blade and in general it has been determined to be somewhat critical to cut the slots or slits approximately 1½ inch to 3 inches in length and 1/64 inches to 3/64 inches in width. Furthermore, it has been found desirable to provide the slits horizontal and spaced apart (both horizontally and vertically) by a distance of approximately 2½ to 3 inches. After cutting the slits 46 as shown in FIGS. 6, so that they extend completely through the skirts, the corner 50 of a card C is inserted through a slit 46 and bent downward, as shown in FIGS. 1 and 6. It is to be noted, that the overlap, vertical offset mounting configuration of the skirts affords a space behind each of the skirts which is convenient both in cutting the slits 46 and in inserting the cards C. In this regard, it is convenient and easy to make the slits without scarring the door D as a result of the spaces provided behind the skirts.

As indicated in FIG. 1, the cards C are shown only in in the lower portion of the structure S. Of course, the cards may be provided over the entire structure S, or alternatively may be provided in a combination with other decorative furnishings. Of course, in the event the system is desired to be employed in such a manner, decorative accessories other than cards may be employed to enhance the appearance of the basic structure S.

After a period of displaying the cards S, the structure S will have served its purpose for the time being. Thereupon, the cards C may be removed simply by withdrawing them in a form in which they are neither destroyed nor mutilated. Next, the fasteners 36 (FIG. 4) are simply withdrawn from the foam members to disassemble the tree structure. Although some reasonable care should be exercised, it is a simple and easy operation to disassemble the tree in a manner so that it may be reassembled without difficulty. In this regard, it is to be noted that no effort must be extended to employ the holes 42 which were previously made in the foam plastic components. That is, these holes are of such small diameter that the structural characteristics of the foam members are not significantly effected by their presence.

From a consideration of the above, it may be seen that the structure hereof may be employed in various forms affording an effective decorative holder as for greeting cards. Furthermore, it is apparent that the structure hereof may be embodied in various forms utilizing the particular technique of fastening component parts together. In this regard, an important consideration resides in the fact that the structure as described above occupies a very small storage space yet is exceedingly convenient to assemble and disassemble.

What I claim is:

1. A decorative door-hung tree structure, for holding greeting cards, comprising:
    a plurality of plastic foam skirts of progressively varying size to simulate the foliage of a tree, said skirts defining elongate slits extending therethrough to receive said greeting cards; and
    fixing means, including a plurality of bristled fasteners extending through adjacent of said skirts to lock said skirts together in lapped relationship, certain of said skirts being connected to skirts above and below said certain skirts.

2. A tree structure according to claim 1 including skirts which define elongate slits of between 1½ to 3 inches in length and 1/64 to 3/64 inches in width extending therethrough to receive said greeting cards.

3. A tree structure according to claim 1 wherein said fixing means further includes a ribbon extending beyond the entire length of said tree and means for fixing said ribbon to said skirts.

4. A tree structure according to claim 1 further including a simulated top decoration of plastic foam and a plastic foam base, said top decoration and said base being affixed at the top and bottom respectfully of said affixed skirts.